US006780359B1

(12) United States Patent
Zehner et al.

(10) Patent No.: US 6,780,359 B1
(45) Date of Patent: Aug. 24, 2004

(54) SYNTHETIC WOOD COMPOSITE MATERIAL AND METHOD FOR MOLDING

(75) Inventors: Burch E. Zehner, Gahanna, OH (US); Jeffrey R. Brandt, Blacklick, OH (US)

(73) Assignee: Crane Plastics Company LLC, Columbus, OH (US)

( * ) Notice: Subject to any disclaimer, the term of this patent is extended or adjusted under 35 U.S.C. 154(b) by 0 days.

(21) Appl. No.: 10/353,606

(22) Filed: Jan. 29, 2003

Related U.S. Application Data

(60) Provisional application No. 60/353,077, filed on Jan. 29, 2002.

(51) Int. Cl.[7] .............................. B29B 9/00; B29B 9/02; B29B 11/06; B29B 13/10; B29B 47/00
(52) U.S. Cl. ..................... 264/115; 264/118; 264/122; 264/124; 264/176.1
(58) Field of Search ................................ 264/109–128, 264/176.1

(56) References Cited

U.S. PATENT DOCUMENTS

| | | | |
|---|---|---|---|
| 2,188,396 A | 1/1940 | Semon ........................... 18/55 |
| 2,489,373 A | 11/1949 | Gilman ......................... 260/37 |
| 2,519,442 A | 8/1950 | Delorme et al. .............. 260/37 |
| 2,558,378 A | 6/1951 | Petry ............................. 260/41 |
| 2,635,976 A | 4/1953 | Meiler et al. ................ 154/132 |
| 2,680,102 A | 6/1954 | Becher ....................... 260/17.3 |
| 2,789,903 A | 4/1957 | Lukman et al. ................ 92/21 |
| 2,935,763 A | 5/1960 | Newman et al. ................ 18/55 |
| 3,287,480 A | 11/1966 | Wechsler et al. ........... 264/122 |
| 3,308,218 A | 3/1967 | Etal ............................. 264/121 |
| 3,309,444 A | 3/1967 | Schueler .................... 264/109 |
| 3,492,388 A | 1/1970 | Inglin-Knüsel ............. 264/129 |
| 3,493,527 A | 2/1970 | Schueler .................... 260/17.2 |
| 3,562,373 A | 2/1971 | Logrippo .................... 264/118 |
| 3,645,939 A | 2/1972 | Gaylord ................ 260/17.4 GC |
| 3,671,615 A | 6/1972 | Price ............................. 264/39 |

(List continued on next page.)

FOREIGN PATENT DOCUMENTS

| | | |
|---|---|---|
| DE | 2042176 | 4/1971 |
| DE | 3801574 | 8/1989 |
| DE | 4033849 | 10/1990 |
| DE | 4221070 | 12/1993 |
| EP | 0269470 | 1/1988 |
| EP | 0586211 | 3/1994 |
| EP | 0586212 | 3/1994 |
| EP | 0586213 | 3/1994 |
| EP | 0747419 | 12/1996 |
| FR | 2270311 | 2/1974 |
| FR | 2365017 | 4/1978 |
| FR | 2445885 | 8/1980 |
| FR | 2564374 | 11/1985 |
| GB | 1443194 | 7/1976 |
| GB | 2036148 | 6/1980 |
| GB | 2104903 | 3/1983 |
| GB | 2171953 | 9/1986 |
| GB | 2186655 | 8/1987 |
| WO | WO 90/08020 | 7/1990 |

OTHER PUBLICATIONS

Bendtsen et al., Mechanical Properties of Wood, pp. 4–2 to 4–44.
Bibliography of Solid Phase Extrusion, pp. 187–195.

(List continued on next page.)

*Primary Examiner*—Stephen J. Lechert, Jr.
(74) *Attorney, Agent, or Firm*—Standley Law Group LLP

(57) ABSTRACT

A method of manufacturing a component in which a cellulosic material is mixed with a plastic material to form a cellulosic reinforced plastic composite. The cellulosic reinforced plastic composite is then formed into irregular shaped granules, such as by grinding. The granules are then molded into the component.

20 Claims, 1 Drawing Sheet

U.S. PATENT DOCUMENTS

| | | |
|---|---|---|
| 3,864,201 A | 2/1975 | Sysuki et al. ............... 161/160 |
| 3,867,493 A | 2/1975 | Seki ........................ 264/45.9 |
| 3,878,143 A | 4/1975 | Baumann et al. ...... 260/17.4 R |
| 3,879,505 A | 4/1975 | Boutillier et al. ............. 264/48 |
| 3,888,810 A | 6/1975 | Shinomura ........... 260/17.4 BB |
| 3,899,559 A | 8/1975 | Johnanson et al. ......... 264/115 |
| 3,922,328 A | 11/1975 | Johnson ..................... 264/46.1 |
| 3,931,384 A | 1/1976 | Forquer et al. ............. 264/120 |
| 3,943,079 A | 3/1976 | Hamed ............. 260/17.4 BB |
| 3,954,555 A | 5/1976 | Kole et al. .................. 162/136 |
| 3,956,541 A | 5/1976 | Pringle ........................... 428/2 |
| 3,956,555 A | 5/1976 | McKean ..................... 428/106 |
| 3,969,459 A | 7/1976 | Fremont et al. ............ 264/109 |
| 4,005,162 A | 1/1977 | Bucking ....................... 264/25 |
| 4,012,348 A | 3/1977 | Chelland et al. ....... 260/28.5 R |
| 4,016,232 A | 4/1977 | Pringle ........................ 264/112 |
| 4,016,233 A | 4/1977 | Pringle ........................ 264/122 |
| 4,018,722 A | 4/1977 | Baker .......................... 260/2.3 |
| 4,029,831 A | 6/1977 | Daunheimer ................ 427/264 |
| 4,045,603 A | 8/1977 | Smith ............................ 428/2 |
| 4,056,591 A | 11/1977 | Goettler et al. ............. 264/108 |
| 4,058,580 A | 11/1977 | Flanders ..................... 264/113 |
| 4,071,479 A | 1/1978 | Broyde et al. ............... 260/2.3 |
| 4,071,494 A | 1/1978 | Gaylord ................... 260/42.14 |
| 4,097,648 A | 6/1978 | Pringle ........................ 428/326 |
| 4,102,106 A | 7/1978 | Golder et al. .................. 52/533 |
| 4,107,110 A | 8/1978 | Lachowicz et al. .. 260/17.4 CL |
| 4,115,497 A | 9/1978 | Halmø et al. ............... 264/115 |
| 4,145,389 A | 3/1979 | Smith ......................... 264/40.7 |
| 4,157,415 A | 6/1979 | Lindenberg ................. 428/284 |
| 4,168,251 A | 9/1979 | Schinzel et al. ....... 260/17.4 R |
| 4,178,411 A | 12/1979 | Cole et al. .................. 428/310 |
| 4,181,764 A | 1/1980 | Totten ........................ 428/155 |
| 4,187,352 A | 2/1980 | Klobbie ........................ 521/79 |
| 4,191,798 A | 3/1980 | Schumacher et al. ......... 428/95 |
| 4,203,876 A | 5/1980 | Dereppe et al. ....... 260/17.4 R |
| 4,228,116 A | 10/1980 | Colombo et al. ........... 264/119 |
| 4,239,679 A | 12/1980 | Rolls et al. ............... 260/42.49 |
| 4,241,133 A | 12/1980 | Lund et al. ................. 428/326 |
| 4,244,903 A | 1/1981 | Schnause ..................... 264/68 |
| 4,248,743 A | 2/1981 | Goettler ............... 260/17.4 BB |
| 4,248,820 A | 2/1981 | Haataja ....................... 264/113 |
| 4,250,222 A | 2/1981 | Mavel et al. ............... 428/285 |
| 4,263,184 A | 4/1981 | Leo et al. ............ 260/17.4 CL |
| 4,263,196 A | 4/1981 | Schumacher et al. ...... 260/33.6 |
| 4,272,577 A | 6/1981 | Lyng ........................... 428/112 |
| 4,273,688 A | 6/1981 | Porzel et al. .......... 260/17.4 R |
| 4,277,428 A | 7/1981 | Luck et al. ................. 264/118 |
| 4,290,988 A | 9/1981 | Nopper et al. .............. 264/112 |
| 4,303,019 A | 12/1981 | Haataja et al. ............. 108/51.1 |
| 4,305,901 A | 12/1981 | Prince et al. ........... 264/176 R |
| 4,317,765 A | 3/1982 | Gaylord ...................... 523/204 |
| 4,323,625 A | 4/1982 | Coran et al. ................ 428/361 |
| 4,376,144 A | 3/1983 | Goettler ........................ 428/36 |
| 4,382,108 A | 5/1983 | Carroll et al. .............. 428/326 |
| 4,382,758 A | 5/1983 | Nopper et al. ............. 425/82.1 |
| 4,393,020 A | 7/1983 | Li et al. ..................... 264/108 |
| 4,414,267 A | 11/1983 | Coran et al. ................ 428/288 |
| 4,420,351 A | 12/1983 | Lussi et al. ................ 156/62.4 |
| 4,430,468 A | 2/1984 | Schumacher ................ 524/109 |
| 4,440,708 A | 4/1984 | Haataja et al. .............. 264/109 |
| 4,480,061 A | 10/1984 | Coughlin et al. ............. 524/13 |
| 4,481,701 A | 11/1984 | Hewitt ......................... 29/416 |
| 4,491,553 A | 1/1985 | Yamada et al. ............... 428/51 |
| 4,503,115 A | 3/1985 | Hemels et al. .............. 428/281 |
| 4,505,869 A | 3/1985 | Nishibori ................... 264/115 |
| 4,506,037 A | 3/1985 | Suzuki et al. ................ 521/82 |
| 4,508,595 A | 4/1985 | Gåsland ...................... 162/158 |
| 4,562,218 A | 12/1985 | Fornadel et al. .............. 524/15 |
| 4,594,372 A | 6/1986 | Natov et al. ................ 523/208 |
| 4,597,928 A | 7/1986 | Terentiev et al. .............. 264/87 |
| 4,610,900 A | 9/1986 | Nishibori ...................... 428/15 |
| 4,645,631 A | 2/1987 | Hegenstaller et al. ......... 264/69 |
| 4,659,754 A | 4/1987 | Edwards et al. ............. 523/214 |
| 4,663,225 A | 5/1987 | Farley et al. ................ 428/290 |
| 4,687,793 A | 8/1987 | Motegi et al. ............... 523/200 |
| 4,717,742 A | 1/1988 | Beshay ........................ 523/203 |
| 4,734,236 A | 3/1988 | Davis ........................... 264/112 |
| 4,737,532 A | 4/1988 | Fujita et al. ................... 524/13 |
| 4,746,688 A | 5/1988 | Bistak et al. ................ 523/220 |
| 4,769,109 A | 9/1988 | Tellvik et al. ............... 162/123 |
| 4,769,274 A | 9/1988 | Tellvik et al. ............... 428/218 |
| 4,783,493 A | 11/1988 | Motegi et al. ................. 524/13 |
| 4,789,604 A | 12/1988 | van der Hoeven .......... 428/503 |
| 4,790,966 A | 12/1988 | Sandberg et al. .............. 264/39 |
| 4,791,020 A | 12/1988 | Kokta ......................... 428/326 |
| 4,801,495 A | 1/1989 | van der Hoeven .......... 428/286 |
| 4,818,604 A | 4/1989 | Tock ......................... 428/319.9 |
| 4,820,749 A | 4/1989 | Beshay ........................ 523/203 |
| 4,851,458 A | 7/1989 | Hopperdietzel ............. 523/205 |
| 4,865,788 A | 9/1989 | Davis ........................... 264/112 |
| 4,889,673 A | 12/1989 | Takimoto .................... 264/118 |
| 4,894,192 A | 1/1990 | Warych ........................ 264/68 |
| 4,915,764 A | 4/1990 | Miani .................... 156/244.19 |
| 4,927,572 A | 5/1990 | van der Hoeven ............ 264/22 |
| 4,927,579 A | 5/1990 | Moore ......................... 264/101 |
| 4,935,182 A | 6/1990 | Ehner et al. ................. 264/112 |
| 4,960,548 A | 10/1990 | Ikeda et al. ................. 264/40.4 |
| 4,968,463 A | 11/1990 | Levasseur .................. 264/40.1 |
| 4,973,440 A | 11/1990 | Tamura et al. .............. 264/114 |
| 4,978,489 A | 12/1990 | Radvan et al. .............. 264/118 |
| 4,988,478 A | 1/1991 | Held ............................ 264/518 |
| 5,002,713 A | 3/1991 | Palardy et al. .............. 264/109 |
| 5,008,310 A | 4/1991 | Beshay .......................... 524/13 |
| 5,009,586 A | 4/1991 | Pallmann .................... 425/311 |
| 5,049,334 A | 9/1991 | Bach .......................... 264/122 |
| 5,057,167 A | 10/1991 | Gersbeck .................... 156/62.2 |
| 5,064,592 A | 11/1991 | Ueda et al. .................. 264/112 |
| 5,075,057 A | 12/1991 | Hoedl ......................... 264/115 |
| 5,075,359 A | 12/1991 | Castagna et al. ............. 524/13 |
| 5,078,937 A | 1/1992 | Eela ............................ 264/109 |
| 5,082,605 A | 1/1992 | Brooks et al. ............. 264/40.6 |
| 5,087,400 A | 2/1992 | Theuveny ................... 264/115 |
| 5,088,910 A * | 2/1992 | Goforth et al. ............. 425/142 |
| 5,096,046 A | 3/1992 | Goforth et al. ............. 198/604 |
| 5,096,406 A | 3/1992 | Brooks et al. .............. 425/205 |
| 5,120,776 A | 6/1992 | Raj et al. ....................... 524/13 |
| 5,153,241 A | 10/1992 | Beshay ........................... 524/8 |
| 5,194,461 A | 3/1993 | Bergquist et al. ............. 524/13 |
| 5,219,634 A | 6/1993 | Aufderhaar ................. 428/156 |
| 5,272,000 A | 12/1993 | Chenoweth et al. ........ 428/283 |
| 5,276,082 A | 1/1994 | Forry et al. ................. 524/504 |
| 5,288,772 A | 2/1994 | Hon ............................. 524/35 |
| 5,302,634 A | 4/1994 | Mushovic .................... 523/219 |
| 5,369,147 A | 11/1994 | Mushovic .................... 523/219 |
| 5,393,536 A | 2/1995 | Brandt et al. ............... 425/112 |
| 5,406,768 A | 4/1995 | Giuseppe et al. ........... 52/730.4 |
| 5,422,170 A | 6/1995 | Iwata et al. ................. 428/218 |
| 5,435,954 A | 7/1995 | Wold .......................... 264/115 |
| 5,441,801 A | 8/1995 | Deaner et al. .............. 428/326 |
| 5,458,834 A | 10/1995 | Faber et al. ................. 264/109 |
| 5,474,722 A | 12/1995 | Woodhams ................ 264/45.3 |
| 5,480,602 A | 1/1996 | Nagaich ..................... 264/122 |
| 5,486,553 A | 1/1996 | Deaner et al. ................ 524/13 |
| 5,497,594 A | 3/1996 | Giuseppe et al. ........... 52/730.4 |
| 5,516,472 A | 5/1996 | Laver ......................... 264/118 |
| 5,518,677 A | 5/1996 | Deaner et al. .............. 264/142 |
| 5,532,065 A | 7/1996 | Gübitz ........................ 428/480 |
| 5,537,789 A | 7/1996 | Minke et al. ................. 52/313 |
| 5,539,027 A | 7/1996 | Deaner et al. ................ 524/13 |
| 5,576,374 A | 11/1996 | Betso et al. ................. 524/451 |

| | | |
|---|---|---|
| 5,585,155 A | 12/1996 | Heikklia et al. ............... 428/36 |
| 5,593,625 A | 1/1997 | Riebel et al. ................ 264/115 |
| 5,695,874 A | 12/1997 | Deaner et al. .............. 428/326 |
| 5,773,138 A | 6/1998 | Seethamraju et al. ........ 428/326 |
| 5,783,125 A | 7/1998 | Bastone et al. ............ 264/45.3 |
| 5,827,462 A | 10/1998 | Brandt et al. ............... 264/179 |
| 5,827,607 A | 10/1998 | Deaner et al. .............. 428/326 |
| 5,836,128 A | 11/1998 | Groh et al. ................... 52/580 |
| 5,866,264 A | 2/1999 | Zehner et al. ............... 428/481 |
| 5,882,564 A | 3/1999 | Puppin ................... 264/177.16 |
| 5,932,334 A | 8/1999 | Deaner et al. ........... 428/292.4 |
| 5,948,505 A | 9/1999 | Puppin ....................... 428/121 |
| 5,948,524 A | 9/1999 | Seethamraju et al. ........ 428/326 |
| 5,981,067 A | 11/1999 | Seethamraju et al. ........ 428/393 |
| 5,985,429 A | 11/1999 | Plummer et al. ........... 428/220 |
| 6,004,668 A | 12/1999 | Deaner et al. .............. 428/326 |
| 6,007,656 A | 12/1999 | Heikkila et al. ............. 156/180 |
| 6,011,091 A | 1/2000 | Zehner ......................... 524/13 |
| 6,015,611 A | 1/2000 | Deaner et al. .............. 428/326 |
| 6,015,612 A | 1/2000 | Deaner et al. .............. 428/326 |
| 6,035,588 A | 3/2000 | Zehner et al. .................. 52/98 |
| 6,054,207 A | 4/2000 | Finley ..................... 428/317.9 |
| 6,103,791 A | 8/2000 | Zehner ......................... 524/13 |
| 6,106,944 A | 8/2000 | Heikkila et al. ............ 428/397 |
| 6,117,924 A | 9/2000 | Brandt ......................... 524/13 |
| 6,122,877 A | 9/2000 | Hendrickson et al. ........ 52/520 |
| 6,131,355 A | 10/2000 | Groh et al. ................ 52/592.1 |
| 6,153,293 A | 11/2000 | Dahl et al. ............... 428/310.5 |
| 6,180,257 B1 | 1/2001 | Brandt et al. ............... 428/532 |
| 6,210,616 B1 | 4/2001 | Suwanda .................... 264/151 |
| 6,210,792 B1 | 4/2001 | Seethamraju et al. ........ 428/326 |
| 6,248,813 B1 | 6/2001 | Zehner ......................... 524/13 |
| 6,265,037 B1 | 7/2001 | Godavarti et al. ............ 428/34 |
| 6,272,808 B1 | 8/2001 | Groh et al. ................ 52/592.1 |
| 6,280,667 B1 | 8/2001 | Koenig et al. ................ 264/68 |
| 6,284,098 B1 | 9/2001 | Jacobsen ................... 162/150 |
| 6,295,778 B1 | 10/2001 | Burt ......................... 52/592.6 |
| 6,337,138 B1 | 1/2002 | Zehner et al. .............. 428/511 |
| 6,341,458 B1 | 1/2002 | Burt .......................... 52/287.1 |
| 6,342,172 B1 | 1/2002 | Finley ...................... 264/45.3 |
| 6,344,504 B1 | 2/2002 | Zehner et al. ................ 524/14 |
| 6,346,160 B1 | 2/2002 | Puppin ........................ 156/88 |
| 6,357,197 B1 | 3/2002 | Serino et al. ............. 52/738.1 |
| 6,358,585 B1 | 3/2002 | Wolff ....................... 428/36.6 |
| 6,360,508 B1 | 3/2002 | Pelfrey et al. ................ 52/520 |
| 6,409,952 B1 | 6/2002 | Hacker et al. ........... 264/171.1 |
| 6,423,257 B1 | 7/2002 | Stobart et al. .............. 264/145 |
| 6,453,630 B1 | 9/2002 | Buhrts et al. ................. 52/177 |
| 6,464,913 B1 | 10/2002 | Korney, Jr. ................. 264/102 |
| 6,498,205 B1 | 12/2002 | Zehner ........................ 524/14 |
| 6,511,757 B1 | 1/2003 | Brandt et al. ............... 428/532 |
| 6,632,863 B2 * | 10/2003 | Hutchison et al. ............ 524/13 |
| 2001/0019749 A1 | 4/2001 | Godavarti et al. ......... 428/34.2 |
| 2001/0051242 A1 | 6/2001 | Godavarti et al. ......... 428/36.9 |
| 2001/0051243 A1 | 12/2001 | Godavarti et al. ......... 428/36.9 |
| 2002/0015820 A1 | 2/2002 | Puppin ....................... 428/121 |
| 2002/0038684 A1 | 4/2002 | Puppin ........................ 156/88 |
| 2002/0040557 A1 | 4/2002 | Felton' ................... 52/309.13 |
| 2002/0092256 A1 | 7/2002 | Hendrickson et al. ........ 52/519 |
| 2002/0192401 A1 | 12/2002 | Matsumoto et al. .......... 428/15 |
| 2002/0192431 A1 | 12/2002 | Edgman .................... 428/181 |

OTHER PUBLICATIONS

Brzoskowski et al., Air–Lubricated Die for Extrusion of Rubber Compounds, Rubber Chemistry and Technology, vol. 60, pp. 945–956.

Collier et al., High Strength Extrudates by Melt Transformation Coextrusion, ANTEC, 1987, pp. 497–502.

Collier et al., Streamlined Dies and Profile Extrusion, ANTEC, 1987, pp. 203–206.

Company News, Plastics Industry News, May 1994, pp. 70–71.

Dalväg et al., The Efficiency of Cellulosic Fillers in Common Thermoplastics. Part II. Filling with Processing Aids and Coupling Agents, 1985, vol. 11, pp. 9–38.

Fiberloc Polymer Composites, B.F. Goodrich, Geon Vinly Division, section 1, pp. 2–15.

Fill Thermoplastics with Wood, Modern Plastics, May 1974, pp. 54–55.

Fillers for Thermoplastics: Beyond Resin Stretching, Modern Plastics International, Oct. 1976, pp. 12–15.

From Sweden: Extruded Interior Trim Made of PVC and Wood Flour, Plastic Building Construction, vol. 9 No. 5, 1986, pp. 5–6.

Henrici–Olive et al., Integral/Structural Ploymer Foams, Technology, Properties and Applications, Springer–Verlag, pp. 111–112.

Klason et al., The Efficiency of Cellulosic Fillers in Common Thermoplastics. Part 1. Filling without Processing Aids or Coupling Agents, Polymeric Materials, 1984, vol. 10, pp. 159–187.

Kokta et al., Composites of Poly(Vinyl Chloride) and Wood Fibers. Part II: Effect of Chemical Treatment, Polymer Composites, Apr. 1990, pp. 84–89.

Kokta et al., Composites of Polyvinyl Chloride–Wood Fibers. I. Effect of Isocyanate as a Bonding Agent, Polym.–Plast. Technol. Eng., 1990, 29(1&2), pp. 87–118.

Kokta et al., Composites of Polyvinyl Chloride–Wood Fibers. III: Effect of Sialne as Coupling Agent, Journal of Vinly Technology, Sep. 1990, pp. 146–153.

Kokta et al., Use of Grafted Wood Fibers in Thermoplastic Composites v. Polystyrene, Centre de recherche en pâtes et papiers, Université du Québec á Trois–Riviéres, Canada.

Kokta et al., Use of Wood Fibers in Thermoplastic Composites, Polymer Composites, Oct. 1983, pp. 229–232.

Maldas et al., Composites of Polyvinyl Chloride–Wood Fibers: IV. Effect of the Nature of Fibers, Journal of Vinyl Technology, Jun. 1989, pp. 90–98.

Malds, et al., Improving Adhesion of Wood Fiber with Polystrene by the Chemical Treatment of Fiber with a Coupling Agent and the Influence on the Mechanical Properties of Composites, Journal of Adhesion Science Technology, vol. 3 No. 7, pp. 529–539 (1989).

Myers et al., "Wood flour and polypropylene or high–density polythylene composites: influence of maleated polypropylene concentration and extrusion temperature on properties", "Wood Fiber/Polymer Composites: Fundamental Concepts, Processes, and Material Options", pp. 49–56.

Myers et al., Bibliography: Composites from Plastics and Wood–Based Fillers, USDA Forest Products Laboratory, Madison, WI, pp. 1–27 odds (1991).

Myers et al., Effects of Composition and Polypropylene Melt Flow on Polypropylene–Waste Newspaper Composites, ANTEC, 1984, pp. 602–604.

Pornnimit et al., Extrusion of Self–Reinforced Polyethylene, Advances in Polymer Technology, vol. 11, No. 2, pp. 92–98.

Raj et al., Use of Wood Fiber as Filler in Common Thermoplastics: Studies on Mechanical Properties, Science and Engineering of Composite Materials, vol. 1 No. 3, 1989, pp. 85–98.

Raj et al., Use of Wood Fibers in Thermoplastics. VII. The Effect of Coupling Agents in Polyethylene–Wood Fiber Composites, Journal of Applied Polymer Science, vol. 37, pp. 1089–1103 (1989).

Resin Stretching: Accent on Performance, Modern Plastic International, Jan. 1974, pp. 58–60.

Rogalski et al., Poly(Vinyl–Chloride) Wood Fiber Composites, ANTEC, 1987, pp. 1436–1441.

Sonwood Outline, Apr., 1975.

Sonwood: a new PVC wood–flour alloy for Extrusions and other Plastic Processing Techniques, Sonesson Plast AB, Malmo, Sweden.

Thomas et al., Wood Fibers for Reinforcing Fillers for Polyolefins, ANTEC, 1984, pp. 687–689.

Wood Filled PVC, Plastics Industry News, Jul. 1996, p. 6.

Woodhams et al., Wood Fibers for Reinforcing Fillers for Polyolefins, Polymer Engineerign and Science, Oct. 1984, pp. 1166–1171.

Yam et al., Composites from Compounding Wood Fibers With Recycled High Density Polyethylene, Polymer Engineering and Science, mid–Jun. 1990, pp. 693–699, vol. 30, No. 11.

Yuskova, et al., Interaction of Components in Poly(Vinyl Choloride) Filled in Polymetization, Makroniol Chem., Macromol. Symp. 29, 315–320 (1989).

Zadorecki et al., Future Prospects for Wood Cellulose as Reinforcement in Organic Polymer Composites, Polymer Composites, Apr. 1989, pp. 69–77.

* cited by examiner

TABLE I
SAMPLE REINFORCED MATERIAL COMPOSITIONS
(ALL AMOUNTS APPROXIMATE)

| COMPOSITION # | PLASTIC MATERIAL (% by Weight) | CELLULOSIC FILLER (% by Weight) | INORGANIC FILLER (Parts/100 Parts Resin)* | STABILIZER (Parts/100 Parts Resin)* | LUBRICANT (Parts/100 Parts Resin)* | PROCESS AID (Parts/100 Parts Resin)* | CROSS-LINKING AGENT (Parts/100 Parts Resin)* | OTHER ADDITIVES |
|---|---|---|---|---|---|---|---|---|
| 1 | PVC (40-70) | Wood Flour (30-60) | Any (Up to 10) | 3-5 | 2-12 | 1-3 | - | - |
| 2 | PP (30-70) | Wood Flour (30-70) | Any (Up to 70) | - | 10-20 | - | - | - |
| 3 | PE (25-40) | Wood Flour (30-70) | Talc (1-20% by Weight) | - | - | - | - | (0-10% by Weight) |
| 4 | PVC (30-70) | Wood Flour (30-70) | - | Tin (at least 3) | at least 5 | - | - | - |
| 5 | PVC (40-80) | Wood Flour (20-60) | Any (Up to 10) | 1-10 | 1-12 | 2-15 | - | Blowing Agent (0.5-5 Parts/100 Parts Resin) |
| 6 | HDPE or PVC (30-90) | Optional | Any (10-70% by Weight) | - | Yes | - | Yes | - |
| 7 | PE, PVC, ABS (20-50) | Wood Flour (30-60) | Any (5-30% by Weight) | Yes | Optional | Optional | Any (0-10% by Weight) | - |
| 8 | PVC (25-50) | Wood Flour (50-75) | - | Tin (2-8) | 4-10 | 2-6 | Polar Thermo-setting Agent (0-4% by Weight) | Optional (Foaming Agents) (Compatibilizers) |
| 9 | HDPE (100 Parts/Total) | Wood Flour (250 Parts/Total) | - | - | Zinc Stearate (5-7) External Wax (4) | - | Phenolic Resin (15) Isocyanate (1-5) | - |
| 10 | PVC (100 Parts) | Wood Flour (250 Parts) | - | Tin (2 Parts) | Calcium Stearate (2) Ester (3) External Wax (4) | Acrylic | - | - |

* Unless otherwise noted

FIG. 1

SYNTHETIC WOOD COMPOSITE MATERIAL AND METHOD FOR MOLDING

This application claims the benefit of U.S. Provisional Application No. 60/353,077, filed Jan. 29, 2002, the entirety of which is hereby incorporated by reference.

BACKGROUND AND SUMMARY OF THE INVENTION

Synthetic wood materials, or more specifically, cellulosic reinforced plastic composites are finding increased use in the manufacture of a variety of products; both decorative and utilitarian. Many manufacturers have determined that reinforced composites may be utilized in products traditionally constructed of natural wood with equivalent or improved results. Such composites have even been used to manufacture products not traditionally made of natural wood, such as, for example, parking stops.

There are various reasons for the increase in popularity of cellulosic reinforced plastic composites. One reason is the decreasing amount of natural lumber available. Although technically, natural wood is a renewable resource, existing forests continue to be harvested at a rate which exceeds the growth rate of newly planted trees. As the supply of lumber, especially large, clear lumber decreases, the cost of manufacturing products using natural wood increases.

Additionally, there are increasing pressures from environmental groups and others who realize that trees are a natural resource valuable as more than a supply of lumber, and should be preserved and protected if possible. As a major portion of many cellulosic reinforced plastic composites may be derived from recycled or waste materials generated by other processes, the use of such a material helps to preserve existing natural resources.

Another reason for the increasing popularity of cellulosic reinforced plastic composites is the properties exhibited by such a material. Many, if not all cellulosic reinforced plastic composites are superior to natural wood in resistance to moisture and insects, and may also possess a reduced coefficient of thermal expansion while still exhibiting a workability similar to that of natural wood. Such properties allow products manufactured from cellulosic reinforced plastic composites to reside and/or be used in environments normally unfavorable to natural wood. For example, decks and other outdoor structures may be manufactured from cellulosic reinforced plastic composites to resist rotting and termite damage, or boat docks may be constructed which are virtually impervious to water damage. Structures and other products manufactured from cellulosic reinforced plastic composites generally may also require little or no maintenance as compared to a similarly constructed product of natural wood.

Therefore, a need exists for cellulosic reinforced plastic composite material having good physical properties, which can thereby be incorporated into the manufacture of an increasing number of products traditionally constructed of natural wood. The manufacture of products using a cellulosic reinforced plastic composite also requires that the material have good moldability and/or workability.

The cellulosic reinforced plastic composite of the present invention exhibits excellent physical properties and moldability characteristics, therefore, allowing it to be used in a wide variety of applications and manufacturing techniques. The cellulosic composite material of the present invention is generally comprised of a plastic resin and a cellulosic filler material in a range of particular proportions, and may be produced in either a solid or a foamed form. Moreover, the ingredients of the composite may be recycled or virgin materials.

A multitude of plastic resins and cellulosic fillers may be combined to form the composite. Suitable thermoplastic resins may include: multi-layer films; high-density polyethylene (HDPE); low-density polyethylene (LDPE); polyvinyl chloride (PVC); chlorinated polyvinyl chloride (CPVC); semi-rigid polyvinyl chloride (S-RPVC); polypropylene (PP); ethyl-vinyl acetate; acrylonitrile butadiene styrene (ABS); polystyrene; and other similar, suitable, or conventional polymers and copolymers. Suitable thermoset materials may include: polyurethanes (isocyanates); phenolic resins; epoxy resins; unsaturated polyester; and other similar, suitable, or conventional thermoset materials. Cellulosic materials acceptable for use in such a composite may include: sawdust; newspapers; alfalfa; wheat pulp; wood chips; wood fibers; wood particles; ground wood; wood flour; wood flakes; wood veneers; wood laminates; paper; cardboard; straw; cotton; rice hulls; coconut shells; corn cobs; peanut shells; bagasse; plant fibers; bamboo fiber; palm fiber; kenaf; jute; flax; and other similar, suitable, or conventional cellulosic materials.

Many other materials may also be added to the composite to improve its properties and improve processing. These materials may include inorganic fillers, cross-linking agents, blowing agents, foaming agents, foam modifiers, lubricants, stabilizers, accelerators, inhibitors, enhancers, compatibilizers, thermosetting agents, process aids, weathering additives, rubber, colorants, and other similar, suitable, or conventional additives.

One problem with using a cellulosic reinforced plastic composite, wherein the cellulosic filler material is a wood byproduct, such as, for example, wood flour, is that the cellulosic filler material tends to retain moisture. Moisture trapped in the cellulosic filler material may cause defects during the product molding process and any unencapsulated cellulosic filler material may absorb moisture after molding. Therefore, the cellulosic filler material must generally be dried prior to introduction into the molding process, or alternatively, thoroughly relieved of a substantial portion of its moisture early in the molding process. It is also important to ensure that the cellulosic filler material is substantially coated by the plastic resin during the molding process. In addition, at least one inorganic filler may be used in place of all or a portion of the cellulosic filler material to help alleviate the problems associated with cellulosic filler material moisture content.

There are a variety of ways in which the plastic resin, cellulosic filler material, and other optional materials may be caused to interact and thereby form the composite. For example, a proper ratio of each of the components may be fed via a separate hopper or similar device into a mold or molding machine, e.g., an extrusion system, during the molding operation. Alternatively, the plastic resin and optional materials may be pre-mixed. Separate hoppers or similar devices may then be used to introduce the pre-mixed materials and cellulosic filler material into a mold or molding machine during the molding operation. Another method mixes the cellulosic filler with the plastic resin (plus some or all of any optional additives, if desired) prior to introducing the mixture to the mold or molding machine. Still another method allows for proper ratios of each of a thermoplastic resin, the cellulosic filler material, and the other optional materials to be fed into a compounder. The compounder is then used to combine and melt the individual components into a pelletized feedstock, which may then be cooled and stored for later use in a molding machine. The composite produced by the compounder does not, however, have to be pelletized and stored. The composite melt may alternatively be transported from the compounder directly to an extruder or other molding machine for immediate use. Yet another method provides for the plastic resin, the cellulosic filler material, and some or all of the other optional materials to be combined in a mixer or blender. Although the blender or mixer may be heated, the components may remain unmelted during mixing. The unmelted, mixed material may then be stored for later use, or immediately transferred to a dryer to lower the moisture content of the cellulosic filler material. After drying, the unmelted, mixed material is preferably fed to a molding machine connected to the dryer, or may be placed in a compression mold. Other components may be added to the mixed, dried material at the molding machine. Furthermore, each of the aforementioned manufacturing methods may be varied.

The cellulosic reinforced plastic composite of the present invention may be used to produce products by any of the traditional molding means, including, but not limited to, extrusion, compression molding, and injection molding. A profile die may be utilized during extrusion to shape the cellulosic reinforced plastic composite material as desired. A packer die may be used to further compress the cellulosic reinforced plastic composite and improve the bonding of the individual material components. Compression molding of the cellulosic reinforced plastic composite material of the present invention may be achieved by placing a dry-blended or pelletized form of the composite into a compression mold and compressing the material under sufficient heat and pressure. Regarding compression molding, it has also been found that a variety of secondary sheet materials may be bonded to the surface of the composite material, either during the compression molding process, or afterwards by using certain adhesives or compatibilizers. Similarly, products may also be produced by traditional injection molding means, utilizing molds and molding equipment designed for the properties and characteristics of the cellulosic reinforced plastic composite material.

In addition to the novel features and advantages mentioned above, other features and advantages of the present invention will be readily apparent from the following descriptions of the drawings and exemplary embodiments.

BRIEF DESCRIPTION OF THE DRAWINGS

FIG. 1 is a table of exemplary composites of the present invention.

DETAILED DESCRIPTION OF THE PRESENT INVENTION

The present invention is directed to a cellulosic reinforced plastic composite suitable for producing products most traditionally manufactured from natural wood, and to products previously not generally suitable for manufacture from a wood material. The present invention also recites numerous methods for producing articles from such a cellulosic reinforced plastic composite, as well as a variety of such articles that may be suitably produced.

Plastic Component

The reinforced composite material of the present invention is comprised partially of a plastic resin. The plastic resin may be of a thermoplastic variety such as multi-layer films; high-density polyethylene (HDPE); low-density polyethylene (LDPE); polyvinyl chloride (PVC); chlorinated polyvinyl chloride (CPVC); semi-rigid polyvinyl chloride (S-RPVC); polypropylene (PP); ethyl-vinyl acetate (EVA); acrylonitrile butadiene styrene (ABS); polystyrene; and other similar, suitable, or conventional polymers and copolymers. However, the plastic resin may be thermoset by incorporating a suitable additive such as: polyurethane (isocyanates); phenolic resin; epoxy resin; or unsaturated polyester. The plastic resin may be provided, for example, in the form of pellets, chunks, or powder.

Although, as stated above, a variety of plastic materials may be employed in the manufacture of the reinforced composite material of the present invention, the use of vinyl-based thermoplastics may be particularly advantageous. Vinyl-based thermoplastics may offer improved weatherability over the olefin-based alternatives, and may also offer good adhesion to the filler material without the need for bonding-promoting additives.

Cellulosic Component

The cellulosic filler used in the reinforced composite material may come from a variety of sources, such as: sawdust; newspapers; alfalfa; wheat pulp; wood chips; wood fibers; wood particles; ground wood; wood flour; wood flakes; wood veneers; wood laminates; paper; cardboard; straw; cotton; rice hulls; coconut shells; corn cobs; peanut shells; bagasse; plant fibers; bamboo fiber; palm fiber; kenaf; jute; and flax. Many of these sources are the byproducts or leftovers of other processes. Wood fillers, for example, may be had from the sawdust and other scraps that result from wooden product manufacturing. In a preferred embodiment of the present invention, the reinforced composite material is produced by combining a wood flour with a plastic resin and possibly other optional materials.

Wood flour is preferred over wood fiber and other wood fillers, because of its relatively fine particle size and resulting ability to mix with the plastic resin. There has been some ambiguity as to what constitutes wood flour. Definitions have been attempted using various parameters to categorize particles as wood flour, or wood fiber, or wood flakes, etc. One such classifying parameter is the mesh size associated with the material. A mesh size is assigned to a material based upon the size of a screen mesh through which the material will pass. Because the number of a screen mesh coincides with the number of wires per inch the screen contains—the higher the mesh size, the smaller are the particles of the material. Although there is some authority to support a wood flour classification up to about 20 mesh, most wood flour will typically pass through a 40 mesh screen, with some wood flours available as small as about 150 mesh.

Another classifying parameter appears to be the aspect ratio of the material particles. Aspect ratio is defined as the length of a material particle divided by its largest cross-section or average diameter. To qualify as wood flour, a particle should have an aspect ratio of between approximately 0.5:1 and 4:1. Wood fibers have been defined to have an aspect ratio as low as 3:1, although most wood fibers are more elongated, with an aspect ratio of up to about 200:1.

Perhaps a more accurate definition comes from the method by which the material is prepared. Wood fiber generally requires treatment with water, steam, and occasionally chemicals, to weaken bonds between individual fibers. Grinding or other friction producing refining is also generally used to separate the fibers. Wood flour, in comparison, is generally produced by the pulverizing of wood residue, such as sawdust, by dry impact, hammering, or other suitable means. The wood flour is then typically separated from larger particles by screening or air classification.

Other Components

The reinforced composite material of the present invention may also include other ingredients, such as inorganic fillers, cross-linking agents, blowing agents, foaming agents, foam modifiers, lubricants, stabilizers, accelerators, inhibitors, enhancers, compatibilizers, thermosetting materials, weathering additives, rubber, colorants, and process aids. These materials may be used individually, or in combination, to improve the characteristics of the reinforced composite and/or enhance the manufacture or moldability thereof.

Inorganic fillers may be substituted for all, or a portion of the cellulosic filler material in the reinforced composite of the present invention. While cellulosic filler materials may be advantageously used to create a reinforced composite material, the use of cellulosic materials provides for certain inherent difficulties. Cellulosic materials are generally sensitive to, and may contain significant amounts of moisture. As a result, cellulosic materials often require pre-drying prior to use, and/or the maintenance of low moisture conditions during the molding process. Special care must also generally be taken to ensure that the cellulosic material is substantially encapsulated by the plastic resin during molding, so that the cellulosic material does not later reabsorb moisture. Additionally, the cellulosic fibers are susceptible to thermal degradation during the molding process.

Inorganic fillers typically, do not require the special processing or molding conditions necessitated by the use of cellulosic materials. The use of inorganic fillers may allow for a reinforced composite material having a greater bulk density and may permit higher rates of extrusion than a composite reinforced only with cellulosic material. Inorganic fillers also allow the reinforced composite to be molded into articles having reduced moisture sensitivity and reduced flame and smoke spread. Good results have been obtained with a variety of inorganic fillers, including mica, talc, calcium carbonate, kaolin clay, magnesium dioxide, titanium dioxide, silica, barium sulfate, wollastanite, and acrylics.

Cross-linking agents may also be added to the reinforced composite material to improve the properties thereof. Cross-linking agents may include thermosetting materials such as polyurethanes (e.g., isocyanates), phenolic resins, unsaturated polyesters, and epoxy resins. The use of cross-linking agents may, for example, reduce moisture absorption and increase the strength of products manufactured from the reinforced composite material.

While one embodiment of the reinforced composite material of the present invention produces articles of solid construction, another embodiment of the present invention provides for articles of foamed construction. Foaming or blowing agents as well as foam modifiers may be added to the reinforced composite material to produce a foam composite material. Because a reinforced foam composite material uses significantly less polymer (plastic) material than a solid reinforced composite material, both the cost of the reinforced composite material and the products manufactured therefrom may be reduced. The use of a foamed composite material in lieu of a solid material also allows for products of a reduced weight. Examples of foam modifiers include acrylic foam modifiers and other similar, suitable, or conventional foam modifiers. An example of an acrylic foam modifier is R&H K-400, which is available from Rohm & Haas. A blowing agent may be an endothermic or exothermic blowing agent. An example of a chemical endothermic blowing agent is Hydrocerol BIH (i.e., sodium bicarbonate/citric acid), available from Clariant Corp., whereas an example of a chemical exothermic foaming agent is azodicarbonamide, available from Uniroyal Chemical Co.

Depending on the result desired, other materials may also be added to the reinforced composite material. For example, stabilizers such as tin stabilizers, lead and metal soaps such as barium, cadmium, and zinc, and other similar, suitable, or conventional stabilizers may be employed to prevent the breakdown of the plastic material during molding. Other materials, such as accelerators, inhibitors, enhancers, compatibilizers, and combinations thereof may be used to affect the bonding, or rate of bonding of the individual components comprising the reinforced composite. Other process aids, such as, for example, acrylic process aids, may be used to aid in the fusion of the composite compound or otherwise enhance the properties of the reinforced composite material. R&H K-120N and R&H K-175 are examples of acrylic process aids that are available from Rohm & Haas.

Both internal and external lubricants can also be used to aid in the molding process. Examples of lubricants include zinc stearate, calcium stearate, esters, amide wax, paraffin wax, and ethylene bis-stearamide. Lubricants may be added to the plastic material to assist the reinforced composite through an extruder or compounder, and to help facilitate mold release.

Examples of weathering additives include titanium dioxide and other ultraviolet absorbers. Ultraviolet absorbers also include organic chemical agents such as benzophenone and benzotriazole types.

Material Manufacture

The reinforced composite material of the present invention may be produced in several ways, depending upon the individual components used and the molding conditions envisioned. The method and parameters of reinforced composite material production also depends on the presence or amount of cellulosic filler material used.

In one embodiment of the present invention, the individual material components are fed from one or more material hoppers or similar devices directly into the barrel of an extruder or injection molding machine. The screw or screws of the extruder or injection molding machine mix and melt the individual components into a homogenous reinforced composite material prior to entrance into an extrusion die or injection mold.

In another embodiment of the present invention, the reinforced composite material may be produced by separately preparing the plastic and cellulosic materials. The cellulosic filler material is generally dried and stored in a moisture free environment until needed. The plastic component, including the plastic resin and any inorganic fillers, lubricants or other additives is preferably combined in a mixer or blender, such as are available from Littleford Day, Inc. or Henschel Mixers America, Inc., for example. During mixing, the plastic resin and other materials are typically raised to an elevated temperature due to the mechanical action of the mixer/blender. Upon completion of the blending of the plastic resin and other components, the mixture is preferably allowed to cool to substantially a predetermined temperature. Upon cooling to the predetermined temperature, the plastic resin mixture may be introduced along with the proper ratio of cellulosic filler material into an extruder or injection molding machine. Thus, pre-mixing of the plastic resin and related additives may allow for a greatly reduced number of materials to be introduced into the molding machine.

Alternatively, the plastic resin, cellulosic filler material and other components may be fed into a compounder in proper ratios. The compounder, such as which is available from the Farrel Corporation, mixes and melts the individual components into a homogenous reinforced composite material. As the mixed reinforced composite material is expelled from the nozzle of the compounder, a rotating knife or similar device is preferably provided to render the reinforced composite material into a pelletized form. The pelletized reinforced composite material is then preferably cooled and stored for later use as feedstock in an extrusion, injection or compression molding operation.

In a similar manner, such a compounder may also be placed in direct communication with an extruder or other molding machine. As in the preceding method, the plastic resin, cellulosic filler material and other components may be fed into a compounder. The materials may be fed into the compounder from automated loss-in-weight feeders or similar devices to ensure the materials are dispensed in the proper ratios. The compounder again mixes and melts the individual components into a homogenous reinforced composite material. However, as the mixed reinforced composite material is expelled from the nozzle of the compounder in this embodiment, it enters directly into a finish extruder or injection molding machine. A transition chute or similar device is preferably provided to guide the material from the compounder into the molding machine. The reinforced composite melt is continuously devolitalized as it travels through the compounder, the transition chute and the molding machine. Material production by this method has resulted in the extrusion of net shapes at a rate exceeding 3,000 pounds per hour.

In yet another embodiment of the present invention, the plastic resin, cellulosic filler material and other components are mixed, preferably in a ribbon-type blender. During the mixing process the materials may, but do not have to be heated. If heating is provided, the temperature within the blender may be kept below the melting temperature of the individual components. The mixed materials may then be transferred directly to a molding device, e.g., an extruder. Alternatively, upon the completion of the mixing process, the mixed components may be stored in dry form for later use. When a supply of the reinforced composite material is needed for molding, the stored material may be removed from storage and dried, if necessary. Preferably, the pre-mixed material is placed in a dryer, such as a rotary tray dryer, which preferably maintains the drying temperature between about 250–350° degrees Fahrenheit. The dryer should preferably provide a sufficient surface area to allow the pre-mixed materials to be relatively spread out. Acceptable dryers are available from the Wyssmont Company, Inc. of Fort Lee, N.J. The dryer is preferably connected to an extruder or similar molding machine, so that once the pre-mixed material is thoroughly dried it may be fed directly into the machine or mold and processed into a finished article. It has been found that by utilizing this method of material manufacture with the dryers mentioned above, between about 2,000 and about 10,000 pounds of dried material per hour may be supplied to a molding machine, at a moisture content of less than 0.5%.

It is important during the mixing of the reinforced composite material that the cellulosic filler material become sufficiently coated by the plastic resin. For this reason, wood flour and similar materials are generally preferred over wood fiber and other larger particle size fillers because of its finer particle size and resulting ability to better mix with the plastic resin. It is difficult, and unnecessary, for the plastic material to penetrate as well as fill every crack and crevice in the filler material during the mixing and molding process. In order to achieve such results, the required pressure would be excessive and could result in undesired degradation of the filler material. It is desired, however, that the filler material, and especially the cellulosic filler materials, be substantially encapsulated within the plastic material. Some of the larger cracks and crevices in the filler material may become filled with the plastic material. However, the process pressure is not sufficient to cause the plastic material to penetrate or fill every crack and crevice in the filler material. While there may exist areas within a molded article where filler materials have remained at least partially in communication, thereby preventing total encapsulation of each particle by the plastic resin, it is critical that the filler materials at the outer surface of the finished article be sufficiently coated with plastic resin to prevent their exposure to moisture.

As mentioned above, the compositions of the present invention may be mixed and extruded in an in-line process, without an intermediate pelletizing step, to form a final net shape. Alternatively, the compositions may be formed into intermediate products prior to forming the desired end product. For instance, the compositions of the present invention may be manufactured into pellets. At a later time, the pellets may be processed into the shape of the desired end product. As an alternative to pellets, the compositions may be molded and then formed into irregular shaped granules. For example, the granules may be formed by a grinding process. The granules may be stored and then later molded into the shape of the desired end product.

Compositions

Numerous different reinforced composite formulations have been tested with successful results. These formulations include grades suitable for extrusion, compression and injection molding, a directly extrudable material, and both solid and foamed forms. For purposes of illustration, a representative group of such formulations is listed in Table I shown in FIG. 1. A multitude of other acceptable formulations may also be possible, although not shown in Table I.

Using techniques well known in the art, the process conditions and the ingredients of the compositions may be selected in order to achieve the desired Young's modulus as well as other desired characteristics such as fastener retention, coefficient of thermal expansion, shrinkage, and surface energy. Some or all of these compositions may be formulated to have a Young's modulus of at least 500,000 psi. In fact, some or all of these compositions may have a Young's modulus of at least 800,000 psi. Additionally, a preferred composition of the present invention may have a closed cell structure. However, other embodiments of a composition of the present invention may have an open cell structure.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention.

What is claimed is:

1. A method of manufacturing a component, said method comprising:

mixing a cellulosic material with a plastic material to form a cellulosic reinforced plastic composite;

forming irregular shaped granules of said cellulosic reinforced plastic composite; and molding said granules into said component.

2. The method of claim 1 wherein said plastic material is comprised a plastic selected from the group consisting of multi-layer films, high-density polyethylene (HDPE), low-density polyethylene (LDPE), polyvinyl chloride (PVC), chlorinated polyvinyl chloride (CPVC), semi-rigid polyvinyl chloride (S-RPVC), polypropylene (PP), ethyl-vinyl acetate (EVA), acrylonitrile butadiene styrene (ABS), and polystyrene.

3. The method of claim 2 wherein said plastic is polyvinyl chloride.

4. The method of claim 2 wherein said plastic is polypropylene.

5. The method of claim 2 wherein said plastic is selected from the group consisting of high density polyethylene and low density polyethylene.

6. The method of claim 1 wherein said cellulosic material is wood.

7. The method of claim 1 wherein said granules are formed by a grinding process.

8. A method of manufacturing a component, said method comprising:

extruding a cellulosic material with a plastic material to form a cellulosic reinforced plastic composite;

forcing said cellulosic reinforced plastic composite through at least one die;

grinding said cellulosic reinforced plastic composite into irregular shaped granules; and extruding said granules through at least one die to form said component.

9. The method of claim 8 wherein said plastic material is comprised a plastic selected from the group consisting of multi-layer films, high-density polyethylene (HDPE), low-density polyethylene (LDPE), polyvinyl chloride (PVC), chlorinated polyvinyl chloride (CPVC), semi-rigid polyvinyl chloride (S-RPVC), polypropylene (PP), ethyl-vinyl acetate (EVA), acrylonitrile butadiene styrene (ABS), and polystyrene.

10. The method of claim 9 wherein said plastic is polyvinyl chloride.

11. The method of claim 9 wherein said plastic is polypropylene.

12. The method of claim 9 wherein said plastic is selected from the group consisting of high density polyethylene and low density polyethylene.

13. The method of claim 8 wherein said cellulosic material is wood.

14. A method of manufacturing a component, said method comprising:

providing a cellulosic reinforced plastic composite;

forming irregular shaped granules of said cellulosic reinforced plastic composite; and extruding said granules through at least one die to form said component.

15. The method of claim 14 wherein said cellulosic reinforced plastic composite is comprised a plastic selected from the group consisting of multi-layer films, high-density polyethylene (HDPE), low-density polyethylene (LDPE), polyvinyl chloride (PVC), chlorinated polyvinyl chloride (CPVC), semi-rigid polyvinyl chloride (S-RPVC), polypropylene (PP), ethyl-vinyl acetate (EVA), acrylonitrile butadiene styrene (ABS), and polystyrene.

16. The method of claim 15 wherein said plastic is polyvinyl chloride.

17. The method of claim 15 wherein said plastic is polypropylene.

18. The method of claim 15 wherein said plastic is selected from the group consisting of high density polyethylene and low density polyethylene.

19. The method of claim 14 wherein said cellulosic reinforced plastic composite is comprised of wood.

20. The method of claim 14 wherein said granules are formed by a grinding process.

* * * * *